US 6,914,860 B1
Jul. 5, 2005

(12) United States Patent
Joo et al.

(54) APPARATUS FOR AND METHOD OF DETECTING REPRODUCTION SIGNAL BY SELECTIVE COMBINATION ACCORDING TO SYSTEM CONDITIONS

(75) Inventors: Seong-sin Joo, Suwon (KR); Tatsuhiro Otsuka, Suwon (KR); Kyung-geun Lee, Seongnam (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 702 days.

(21) Appl. No.: 09/666,857

(22) Filed: Sep. 21, 2000

(30) Foreign Application Priority Data

Sep. 21, 1999 (KR) ......................................... 1999-40647

(51) Int. Cl.[7] ................................................. G11B 5/09
(52) U.S. Cl. .................................. 369/47.24; 369/53.12
(58) Field of Search ........................... 369/47.23, 47.24, 369/47.15, 47.16, 47.17, 47.2, 47.28, 124.02, 124.07, 124.08, 124.09, 53.12, 53.13, 53.14, 53.19

(56) References Cited

U.S. PATENT DOCUMENTS

| | | | |
|---|---|---|---|
| 4,536,866 A | 8/1985 | Jerome et al. | |
| 5,483,515 A | 1/1996 | Cheng et al. | |
| 5,701,283 A | 12/1997 | Alon et al. | |
| 5,768,232 A | 6/1998 | Muramatsu et al. | |

FOREIGN PATENT DOCUMENTS

| | | |
|---|---|---|
| EP | 0 332 193 | 3/1989 |
| EP | 0 773 541 | 5/1997 |
| EP | 0 822 553 | 2/1998 |
| JP | 1-122041 | 5/1989 |
| JP | 5-28502 | 2/1993 |
| JP | 5-128584 | 5/1993 |
| JP | 5-242512 | 9/1993 |
| JP | 10-97765 | 4/1998 |

*Primary Examiner*—Paul W. Huber
(74) *Attorney, Agent, or Firm*—Stein, McEwen & Bui, LLP

(57) ABSTRACT

A method of detecting a reproducing signal, and a circuit therefor. This circuit includes a detector, a control unit and a compensator. The detector detects the outputs of an optical detection device corresponding to a combination of signals corresponding to sections of the optical detection device arranged in the tangential direction, the outputs corresponding to a combination of signals corresponding to sections of the optical detection device arranged in the radial direction, and/or the outputs corresponding to a combination of signals corresponding to sections of the optical detection device arranged diagonally. The control unit provides a selection control signal and a compensation signal on the basis of the results of detection of the data conditions recorded on the optical recording medium, the interference between optical signals reflected/diffracted from pits in close proximity to each other and from adjacent tracks on a recording medium, and/or various system states. The compensator selects some of the outputs of the optical detection device provided via the detector in response to the selection control signal, and adaptively compensates for the selected outputs in response to the compensation signal. In this circuit, only some of the outputs of an optical detection device, which are the least degraded, are used as a reproducing signal, depending on the system states, the data conditions and/or the interference between optical signals reflected/diffracted from pits in close proximity and from adjacent tracks on a recording medium. Thus, the fitter of a detected signal is reduced, and the performance of the system can be improved.

32 Claims, 4 Drawing Sheets

APPARATUS FOR AND METHOD OF DETECTING REPRODUCTION SIGNAL BY SELECTIVE COMBINATION ACCORDING TO SYSTEM CONDITIONS

CROSS-REFERENCE TO RELATED APPLICATION

This application claims the benefit of Korean Application No. 99-40647, filed Sep. 21, 1999, in the Korean Patent Office, the disclosure of which is incorporated herein by reference.

BACKGROUND OF THE INVENTION

1. Field of the Invention

The present invention relates to detection of a reproduction signal, and more particularly, to a method of detecting only some of the outputs of an optical detection device, the detected outputs being least distorted or degraded, in an optical recording/reproduction system, and a circuit thereof.

2. Description of the Related Art

In the recording/reproduction system of optical recording media such as compact discs (CDs) and digital versatile discs (DVDs), data is manifested on a disc in the form of pits on a substrate or modifications of a recording film. Data on a disc is detected by illuminating the disc with a laser, and detecting light reflected back. In the recording/reproduction system, a signal is degraded due to a time delay between the outputs of an optical detection device. This time delay may be caused by the geometry (for example, the width, the length, the depth and the angle) of a data pit and a recording domain. This time delay may also be caused by interference between data in a tangential direction. When a time delay is caused between the outputs of an optical detection device, a reproduction signal is distorted. When the amplitude of the reproduction signal is not properly detected, the performance of the system is degraded.

Optical discs are being developed for high-density recording and high-speed reproduction, to record and/or reproduce a high definition (HD) image. As recording/reproduction systems are developed for high-density and high-speed recording/reproduction, inter-symbol interference increases, causing time delays between adjacent data and distortion and deterioration of the signal. Accordingly, the performance of the reproduction signal is degraded, requiring considerable effort and extra cost during implementation of the system.

The prior art apparatus for reproduction signal detection is shown in FIG. 1. First, in order to detect information recorded on a disc 100, a pickup unit (P/U) 102 radiates a beam emitted from a light source (for example, a laser diode) to the disc 100, and a multi-section optical detection device 104 (which can also be called a detection sensor) receives and divides an optical signal reflected by the disc 100 into multiple signals. The optical optical detection device 104 is conventionally a photodetector (PD).

First, second, third and fourth current/voltage (IV) converters 106, 108, 110 and 112 convert current signals A, B, C and D output by the optical detection device 104 into voltage signals. An arithmetic unit 114 sums the voltage signals output by the first, second, third and fourth IV converters 106, 108, 110 and 112, and outputs the sum as a radio frequency reproducing signal RF SUM.

In the prior art, a method of detecting a reproducing signal by simple addition of the outputs of the I/V converters 106, 108, 110 and 112 is adopted. Disadvantages of this method are that the reproducing signal is degraded due to the data conditions recorded on the disc, crosstalk, interference between optical signals reflected/diffracted from pits in close proximity to each other, from adjacent tracks on a recording medium, and from other problems with a system (for example, defocusing, detracking and tilting). Therefore, the quality of the reproducing signal and the performance of the system are degraded.

SUMMARY OF THE INVENTION

Accordingly, it is an object of the present invention to provide a method of detecting a reproducing signal, by which only some of the outputs of an optical detection device, namely those that are the least degraded, are reproduced. Reproduction is based upon data conditions, the interference between optical signals reflected/diffracted from pits in close proximity to each other and from adjacent tracks on a recording medium, and/or the state of the system.

A second object of the present invention is to provide a method of detecting an optimal reproducing signal while overcoming problems caused by data conditions, crosstalk, and interference between optical signals reflected/diffracted from pits in close proximity to each other and from adjacent tracks on a recording medium.

A third object of the present invention is to provide a method of detecting an optimal reproducing signal while overcoming defocusing.

A fourth object of the present invention is to provide a method of detecting an optimal reproducing signal while overcoming detracking.

A fifth object of the present invention is to provide a method of detecting an optimal reproducing signal while overcoming radial tilting.

A sixth object of the present invention is to provide a method of detecting an optimal reproducing signal while overcoming tangential tilting.

A seventh object of the present invention is to provide a method of detecting an optimal reproducing signal by adaptively compensating for signal interference caused by data conditions, crosstalk, the interference between optical signals reflected/diffracted from pits in close proximity to each other and from adjacent tracks on a recording medium, defocusing, detracking, radial tilting and/or tangential tilting.

An eighth object of the present invention is to provide a circuit for detecting a reproducing signal, in which only some of the outputs of an optical detection device, namely those that are the least degraded, are reproduced. Reproduction is based upon data conditions, the interference between optical signals reflected/diffracted from pits in close proximity to each other and from adjacent tracks on a recording medium, and/or the state of the system.

Additional objects and advantages of the invention will be set forth in part in the description which follows, and, in part, will be obvious from the description, or may learned by practice of the invention.

To achieve the above and other objects of the present invention, there is provided a method of detecting a reproducing signal using an optical detection device to receive an optical signal reflected from an optical recording medium. The received signal is divided into multiple signals corresponding to sections of the optical detection device which are arranged in a matrix with rows in the tangential direction and columns in the radial direction of the optical recording medium. The method includes: (a) selecting some signals, namely those which are less degraded than other signals, from among the output signals of the optical detection device, the selection is based upon data conditions recorded on the optical recording medium, interference between optical signals reflected/diffracted from pits in close proximity to each other and from adjacent tracks on the optical recording medium, and/or various system states; and (b) obtaining a reproducing signal from the selected signals by compensating for the amount of signal interference caused by the data conditions, the interference between optical signals reflected/diffracted from pits in close proximity to each other and from adjacent tracks on a recording medium, and/or various system states.

To achieve the above and other objects of the present invention, there is provided a device to detect a reproducing signal using an optical detection device including photodetecting means to receive an optical signal reflected from an optical recording medium and dividing the received signal into multiple signals. The device includes a detector, a control unit, and a compensator. The detector detects the outputs of the optical detection device corresponding to a combination of signals corresponding to sections of the photodetecting means arranged in the tangential direction, the radial direction, and/or the diagonal direction. The control unit provides a selection control signal and a compensation signal on the basis of the results of detection of data conditions recorded on the optical recording medium, the interference between optical signals reflected/diffracted from pits in close proximity to each other, and from adjacent tracks on the optical recording medium, and/or various system states. The compensator selects some of the outputs of the optical detection device provided via the detector in response to the selection control signal, and adaptively compensates for the selected outputs in response to the compensation signal.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DESCRIPTION OF THE PREFERRED EMBODIMENTS

Figure 1:
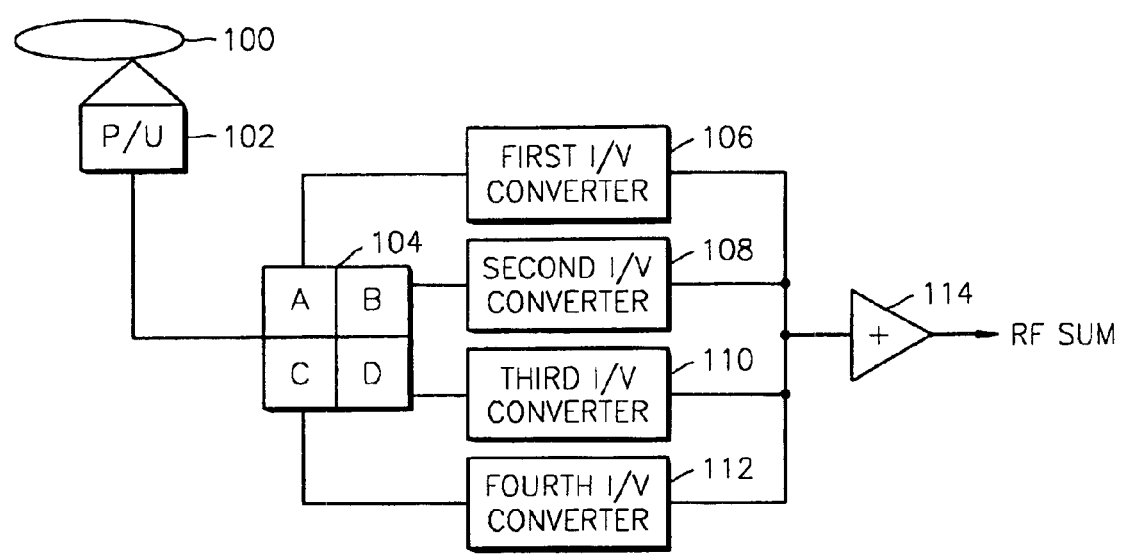
FIG. 1 is a block diagram illustrating the principle of conventional reproducing signal detection.

Reference will now be made in detail to the present preferred embodiments of the present invention, examples of which are illustrated in the accompanying drawings, wherein like reference numerals refer to like elements throughout.

Figure 2:
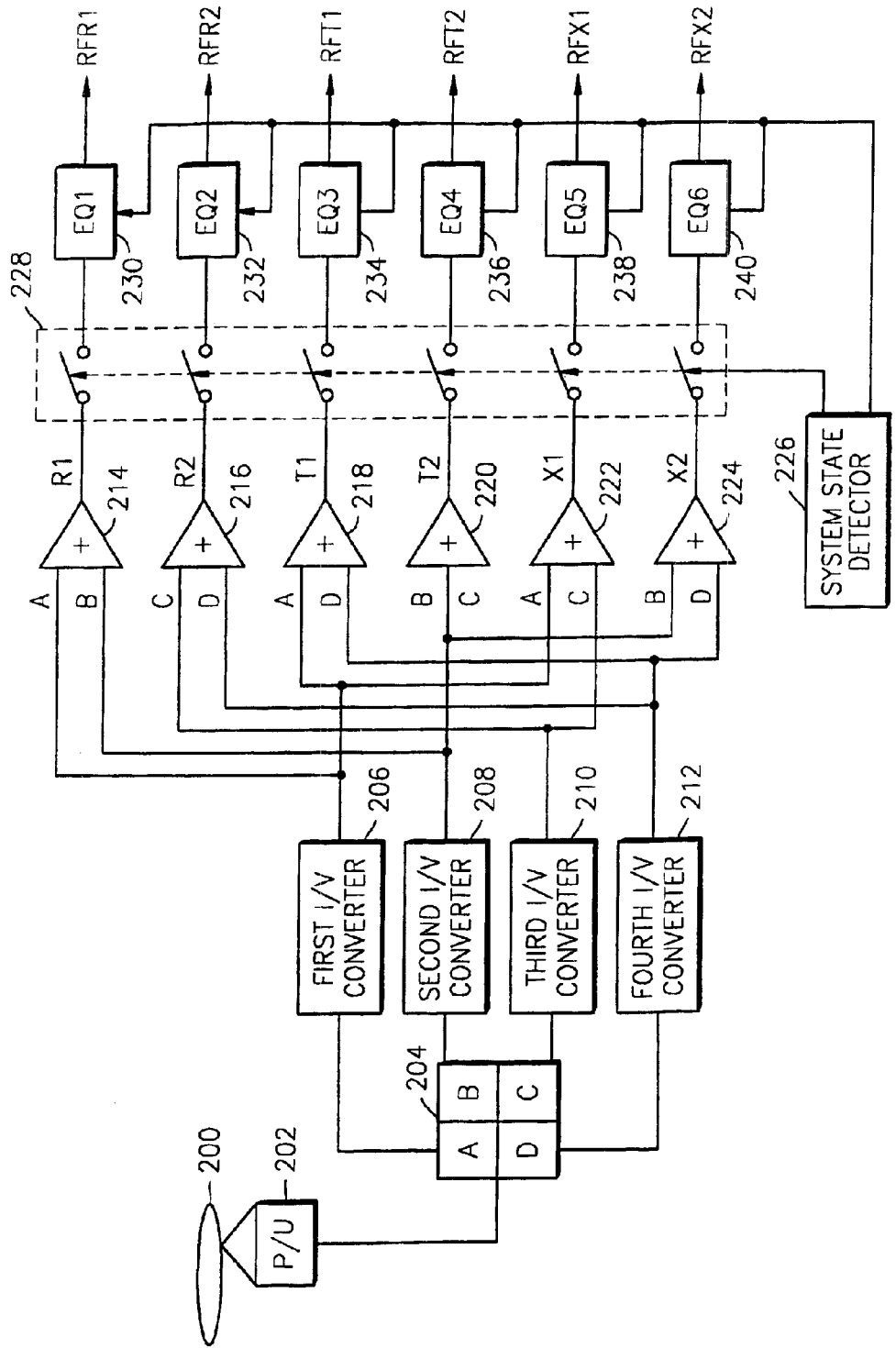
FIG. 2 is a circuit diagram of a reproducing signal detection circuit according to an embodiment of the present invention.

Referring to FIG. 2, which shows a reproducing signal detection circuit according to an embodiment of the present invention, a pickup unit (P/U) 202 detects information recorded on a disc 200, and projects a beam emitted from a light source (laser diode) to the disc 200. An n-section optical detection device 204 receives and divides an optical signal reflected back from the disc 200 into multiple signals. Here, the optical detection device 204 groups multiple outputs into two parts by combining the multiple outputs in the radial direction, the tangential direction, or diagonally. The grouping depends on the data conditions, the interference between optical signals reflected/diffracted from pits in close proximity to each other and from adjacent tracks on the disc 200, or the state of a system (for example, problems with focusing, tracking, or tilting). Hence, the multiple outputs of the optical detection device 204 are grouped into degraded output signals and less degraded output signals. Using this characteristic, only the less degraded output signal group is reproduced depending on the state of the system, the data conditions or the interference between optical signals reflected/diffracted from pits in close proximity to each other and from adjacent tracts on the disc 200. Here, a signal used as a reproducing signal is automatically selected by a system state detector 226 to detect the state of a system (for example, focusing or defocusing, tracking or detracking, and tilting), the data conditions, or the interference between optical signals reflected/diffracted from pits in close proximity to each other and from adjacent tracks on the disc 200. Some detection signals of the optical detection device 204, which are selected to compensate for abnormal operating conditions, detected data conditions, or detected interference between optical signals reflected/diffracted from pits in close proximity to each other and from adjacent tracks on the disc 200, are adaptively equalized, so that an optimal reproducing signal is detected.

That is, first, second, third and fourth current/voltage (I/V) converters 206, 208, 210 and 212 convert current signals A, B, C and D output by the optical detection device 204, into voltage signals. A first adder 214 adds a voltage signal output from the first I/V converter 206, to a voltage signal output from the second I/V converter 208, which corresponds to the output B of the optical detection device 204, and outputs the sum (A+B) as a signal RI. A second adder 216 adds a voltage signal output from the third I/V converter 210, which corresponds to the output C of the optical detection device 204, to a voltage signal output from the fourth I/V/ converter 212, which corresponds to the output D of the optical detection device 204, and outputs the sum (C+D) as a signal R2. Here, the outputs A and B of the optical detection device 204 have the same distance from the center of the disc 200, and the outputs C and D of the optical detection device 204 have the same distance from the center of the disc 200. A third adder 218 adds a voltage signal output from the first I/V converter 206, which corresponds to the output A of the optical detection device 204, to a voltage signal output from the fourth I/V converter 212, which corresponds to the output D of the optical detection device 204, and outputs the sum (A+D) as a signal T1. A fourth adder 220 adds a voltage signal output from the second I/V converter 208, which corresponds to the output B of the optical detection device 204, to a voltage signal output from the third I/V converter 210, which corresponds to the output C of the optical detection device 204, and outputs the sum (B+C) as a signal T2. Here, the outputs A and D of the optical detection device 204 are on the same level in a tangential direction, and the outputs B and C of the optical detection device 204 are on the same level in a tangential direction. Accordingly, a time delay is generated between the output of the optical direction device 204 supplied via the third adder 218 and the output of the optical detection device 204 supplied via the fourth adder 220, in a tangential direction, due to data conditions, crosstalk, or the interference between optical signals reflected/diffracted from pits in close proximity to each other and from adjacent tracks on the disc 200. A fifth adder 222 adds a voltage signal output from the first I/V converter 206, which corresponds to the output A of the optical detection device 204, to a voltage signal output from the third I/V converter 210, which corresponds to the output C of the optical detection device 204, and outputs the sum (A+C) as a signal X1. A sixth adder 224 adds a voltage signal output from the second I/V converter 208, which corresponds to the output B of the optical detection device 204, to a voltage signal output from the fourth I/V converter 212, which corresponds to the output D of the optical detection device 204, and outputs the sum (B+D) as a signal X2. Here, the outputs of the fifth and sixth adders 222 and 224 are used when defocusing occurs, since they are obtained by adding diagonally-aligned outputs among the outputs of the optical detection device 204.

The system state detector 226 detects not only the system state (for example, defocusing, detracking and tilting) but also the data conditions and the interference between optical signals reflected/diffracted from pits in close proximity to each other and from adjacent tracks on the disc 200, and provides a selection control signal to a selector 228 so that at least one good-performance signal is selected from among the outputs of the first through sixth adders 214 through 224 depending on a detected system state, detected data conditions and/or detected interference between optical signals reflected/diffracted from pits in close proximity to each other and from adjacent tracks on the disc 200. Also, the system state detector 226 calculates an adaptive equalization amount for compensating for the detected system state, the detected data conditions and/or the detected interference between data, and provides the adaptive equalization amount to first through sixth equalizers 230 through 240.

The selector 228 selects at least one signal from among the outputs of the first through sixth adders 214 through 224 in response to the selection control signal of the system state detector 226, and provides the selected signal to the corresponding first through sixth equalizers 230 through 240. The first through sixth equalizers 230 through 240 (EQI through EQ6) equalize the outputs of the optical detection device 204 selected by the selector 228 according to the adaptive equalization amount provided from the system state detector 226, in thereby detecting an optimal reproducing signal.

Here, the first through fourth I/V converters 206 through 212, and the first through sixth adders 214 through 224 are referred to as detectors for detecting the outputs of the optical detection device 204 combined in the tangential direction, the radial direction, and diagonally. The system state detector 226 is referred to as a control unit for detecting the data conditions, the interference between optical signals reflected/diffracted from pits in close proximity to each other and from adjacent tracks on the disc 200, and/or various system states, and providing a selection control signal and a compensation signal on the basis of the results of the detection. The selector 228 and the first through sixth equalizers 230 through 240 can be referred to as a compensator for compensating for unequal levels of some of the outputs of the optical detection device 204 supplied from the detector in response to the compensation signal (adaptive equalization amount) provided from the system state detector 226.

In the present invention, the selector 228 can be installed at the rear of the first through sixth equalizers 230 through 240, so that the signal having the best quality is selected as an optimal reproducing signal from among the equalized results RFR1, RFR2, RFT1, RFT2, RFX1 and RFX2 obtained by equalizing the signals R1, R2, T1, T2, X1 and X2 through first through sixth equalizers 230 through 240.

The detection of a reproducing signal when the system state detector 226 detects data conditions or the interference between optical signals reflected/diffracted from pits in close proximity to each other and from adjacent tracks on the disc 200, when it detects defocusing, when it detects detracking, when it detects radial tilting, and when it detects tangential tilting, will now be described on the basis of the operations of the selector 228 and the first through sixth equalizers 230 through 240.

(1) Detection of a reproducing signal depending on the data conditions or during the interference between optical signals reflected/diffracted from pits in close proximity to each other and from adjacent tracks on the disc 200.

As for a signal reproduced from data on the disc 200, one of the output signals T1 and T2 of the optical detection device 204 shown in FIG. 2 is less degraded than the other. The selector 228 selects one of the detected signals T1 and T2 in response to a selection control signal provided from the system state detector 226. The third or fourth equalizer 234 or 236, which receives the selected detected signal, equalizes the selected detected signal according to the adaptive equalization amount that can compensate for the amount of signal interference caused due to the data conditions or the interference between optical signals reflected/diffracted from pits in close proximity to each other and from adjacent tracks on the disc 200, which are detected by the system state detector 226. In this way, an optimal RF reproducing signal is provided.

Figure 3:
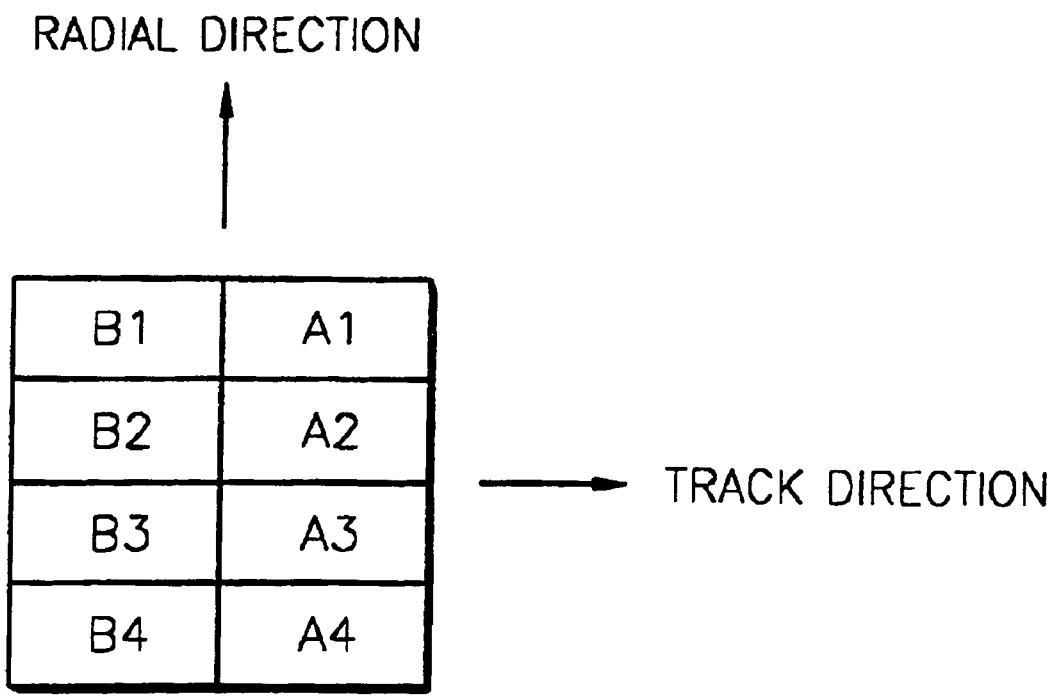
FIG. 3 shows an example of a 8-section photodetector that can be used as the optical. detection device shown if FIG. 2.

In the case of the optical detection device 204 used in FIG. 2, which is a four-section photodetector, track-directional sum signals A+D and B+C are represented as T1 and T2. However, the present invention is not limited to the four-section photodetector. In another embodiment, when the eight-section photodetector shown in FIG. 3 is used, T1 can indicate the sum of B1, B2, B3 and B4, and T2 can indicate the sum of A1, A2, A3 and A4.

(2) Detection of a reproducing signal upon defocusing

As for a signal reproducing from data on the disc 200, one of the detected signals X1 and X2 output by the optical detection device 204 is better than the other due to the direction of defocusing. The selector 228 selects the better quality signal from the detected signals X1 and X2 in response to a selection control signal provided from the system state detector 226. The fifth or sixth equalizer 238 or 240, which receives the selected detected signal, equalizes the selected detected signal according to the adaptive equalization amount that can compensate for the amount of signal interference caused due to the defocusing detected by the system state detector 226. In this way, an optimal RF reproducing signal is provided.

(3) Detection of a reproducing signal upon detracking

As for a signal reproduced from data on the disc 200, one of the detected signals R1 and R2 output by the optical detection device 204 is better than the other due to the direction of detracking. The selector 228 selects one of the detected signals R1 and R2 in response to a selection control signal provided from the system state detector 226. The first or second equalizer 230 or 232, which receives the selected detected signal, equalizes the selected detected signal according to the adaptive equalization amount that can compensate for the amount of signal interference caused due to the detracking detected by the system state detector 226. In this way, an optimal RF reproducing signal is provided.

(4) Detection of a reproducing signal upon radial tilting

As for a signal reproduced from data on the disc 200, one of the detected signals R1 and R2 output by the optical detection device 204 is better than the other due to radial tilting. The selector 228 selects one of the detected signals R1 and R2 in response to a selection control signal provided from the system state detector 226. The first or second equalizer 230 or 232, which receives the selected detected signal, equalizes the selected detected signal according to the adaptive equalization amount that can compensate for the amount of signal interference caused due to the radial tilting detected by the system state detector 226. In this way, an optimal RF reproducing signal is provided.

(5) Detection of a reproducing signal upon tangential tilting

As for a signal reproduced from data on the disc, one of the detected signals T1 and T2 output by the optical detection device 204 is better than the other due to tangential tilting. The selector 228 selects one of the detected signals T1 and T2 in response to a selection control signal provided from the system state detector 226. The third or fourth equalizer 234 or 236, which receives the selected detected signal, equalizes the selected detected signal according to the adaptive equalization amount that can compensate for the amount of signal interference caused due to the tangential tilting detected by the system state detector 226. In this way, an optimal RF reproducing signal is provided.

As described above, the d outputs of an optical detection device, which can be an n-section photodetector, are combined and grouped into two parts, depending on the data conditions recorded on a disc, the state of the interference between optical signals reflected/diffracted from pits in close proximity to each other and from adjacent tracks on a recording medium, or system states. When two signals obtained by the combination are compared, one detection signal is less degraded than the other. If two detected signals having opposite properties are simply combined, the characteristics of an inferior signal are included in the result, which prevents a good reproducing signal from being obtained.

To be more specific, when radial tilting occurs in the positive direction of a disc, the detected signal R1, which is one of the outputs of sections of the photodetector having the same distance from the center of the disc, is better than the detected signal R2, which is another signal output from sections of the photodetector having the same distance from the center of the disc. Conversely, when radial tilting occurs in the negative direction of the disc, the detected signal R1 is more degraded than the detected signal R2. The detected signal that improves the reproducing signal is selected from the two detected signals, in order to prevent degradation of the reproducing signal, resulting in an improvement in reproduction.

Figure 4:
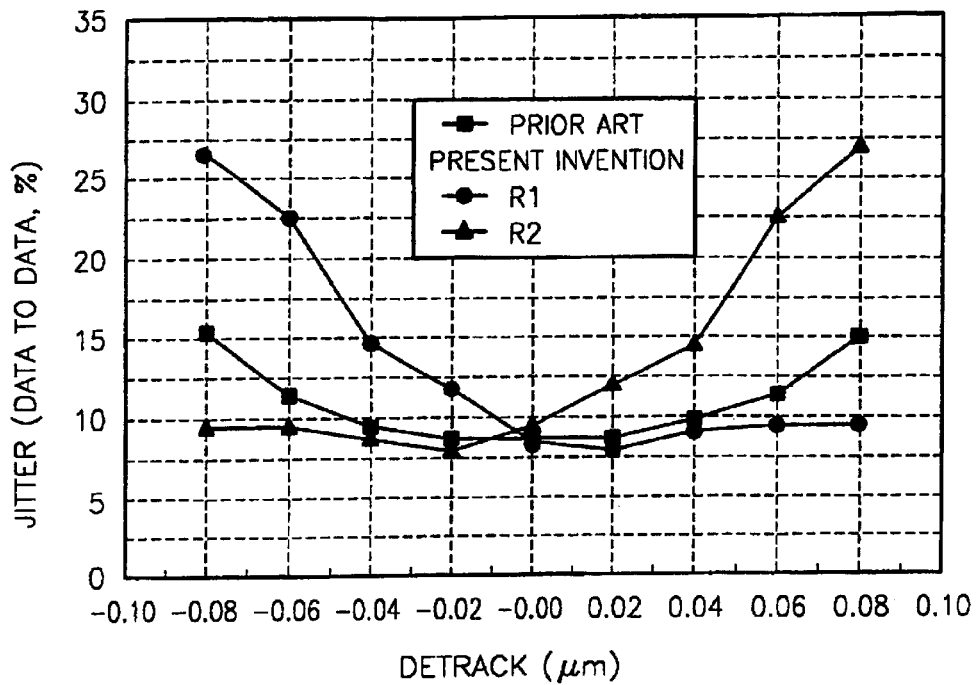
FIG. 4 is a graph showing the results of detection of reproducing signals during detracking to explain the effects of the present invention.

The effects of the present invention described above will now be described referring to FIGS. 4 and 5. In FIG. 4, which shows the results of detection of a reproducing signal during detracking, the jitter values of reproducing signals according to the present invention are compared to that in the prior art. Upon negative detracking, the detected signal R2 has less jitter than the prior art and the detected signal R1. Thus, in this case, it is preferable that the detected signal R2 is used as a reproducing signal. Upon positive detracking, the detected signal R1 has less jitter than the prior art and the detected signal R2. Thus, in this case, it is preferable that the detected signal R1 is used as a reproducing signal.

For example, in the prior art, when a reproducing signal is detected using the sum of the outputs of a 4-section photodetector upon detracking within a range of +0.08 $\mu$m, jitter is about 15.6% (data to data). However, in the present invention, when the detected signal R2 is used upon detracking of 0.08 $\mu$m, jitter of about 9.22% is obtained. When the detected signal RI is used upon detracking of +0.08 $\mu$m, jitter of about 9.22% is obtained, whereas jitter is approximately 15% in the prior art. Therefore, the present invention can obtain a reproducing signal having good characteristics and a wide margin, as compared to the prior art.

Figure 5:
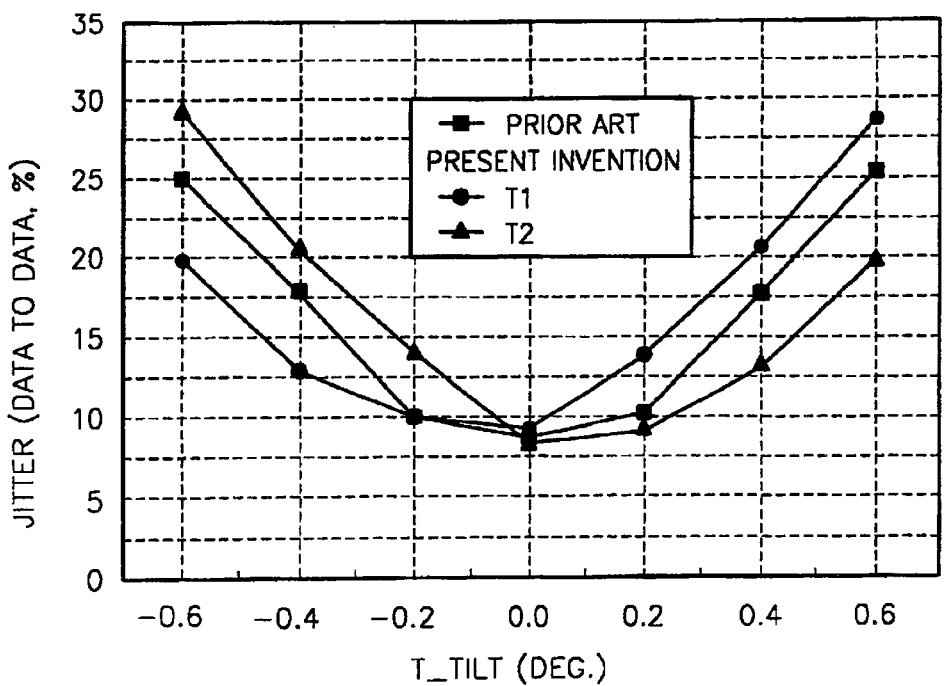
FIG. 5 is a graph showing the results of detection of reproducing signals during tangential tilting to explain the effects of the present invention.

In FIG. 5, which shows the results of detection of a reproducing signal during tangential tilting, the jitter values of reproducing signals according to the present invention are compared to those of the prior art. Upon negative tilting, the detected signal T1 has less jitter than the prior art and the detected signal T2. Thus, in this case, it is preferable that the detected signal T1 is used as a reproducing signal. Upon positive tilting, the detected signal T2 has less jitter than the prior art and the detected signal T1. Thus, in this case, it is preferable that the detected signal T2 is used as a reproducing signal.

In the present invention, only some of the outputs of an optical detection device, namely those that are the least degraded, are used to reproduce a signal. Reproduction depends on the system states, the data conditions and/or the interference between optical signals reflected/diffracted from pits in close proximity and from adjacent tracks on a recording medium. Thus, the jitter of a detected signal is improved, and the performance of the system can be improved.

Also, in the present invention, the demodulation degree of a signal, which is the most important factor in signal processing, is improved. Hence, signal distortion and signal degradation are reduced, and the performance of the system can be improved.

Furthermore, the use of a reproducing signal according to the present invention increases the defocusing margin, the detracking margin, the radial tilting margin, and the tangential tilting margin, so that the performance of the system can be improved.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of detecting a reproducing signal using an optical detection device to receive an optical signal reflected from a single track on an optical recording medium and dividing the received signal into multiple signals corresponding to sections of the optical detection device which are arranged in a matrix with rows in a tangential direction and columns in a radial direction of the optical recording medium, comprising:

selecting signals which are less degraded than other signals, from among the multiple signals corresponding to sections of the optical detection device, on the basis of data conditions recorded on the optical recording medium, interference between optical signals reflected/diffracted from pits in close proximity to each other and from adjacent tracks on the optical recording medium, and/or various system states; and obtaining a reproducing signal from the selected signals by compensating for an amount of the interference caused by the data conditions, the interference between optical signals reflected/diffracted from pits in close proximity to each other and from adjacent tracks on the recording medium, and/or various system states.

2. The method of claim 1, wherein the selecting of the signals which are less degraded than other signals comprises selecting a combination of signals corresponding to sections of the optical detection device arranged in the radial direction based upon the signal interference caused by the data conditions or the interference between optical signals reflected/diffracted from pits in close proximity to each other and from adjacent tracks on the optical recording medium.

3. The method of claim 1, wherein the selecting of the signals which are less degraded than other signals comprises selecting a combination of signals corresponding to sections of the optical detection device arranged diagonally based upon a signal interference caused by defocusing.

4. The method of claim 1, wherein the selecting of the signals which are less degraded than other signals comprises selecting a combination of signals corresponding to sections of the optical detection device arranged in the tangential direction based upon a signal interference caused by detracking.

5. The method of claim 1, wherein the selecting of the signals which are less degraded than other signals comprises selecting a combination of signals corresponding to sections of the optical detection device arranged in the tangential direction based upon a signal interference caused by radial tilting.

6. The method of claim 1, wherein the selecting of the signals which are less degraded than other signals comprises selecting a combination of signals corresponding to sections of the optical detection device arranged in the radial direction based upon a signal interference caused by tangential tilting.

7. The method of claim 1, wherein the obtaining of the reproducing signal from the selected signals comprises equalizing the selected signals according to an amount of the signal interference caused by the data conditions, the interference between optical signals reflected/diffracted from pits in close proximity to each other and from adjacent tracks on the optical recording medium, and/or the various system states.

8. The method of claim 1, further comprising using the reproducing signal to increase a defocusing margin of a system.

9. The method of claim 1, further comprising using the reproducing signal to increase a detracking margin of a system.

10. The method of claim 1, further comprising using the reproducing signal to increase a radial tilting margin of a system.

11. The method of claim 1, further comprising using the reproducing signal to increase a tangential tilting margin of a system.

12. A method of detecting a reproducing signal using an optical detection device including a photodetector to receive an optical signal reflected from an optical recording medium and to divide the received signal into multiple signals, comprising:
   detecting first output signals of the optical detection device that correspond to a combination of signals corresponding to sections of the photodetector arranged in a radial direction, and/or outputs corresponding to a combination of signals corresponding to sections of the photodetector arranged diagonally; and
   detecting a good signal from among second output signals obtained by reproducing the first output signals, as the reproducing signal.

13. The method of claim 12, further comprising controlling the good signal by detecting data conditions recorded on the optical recording medium, an interference between optical signals reflected/diffracted from pits in close proximity to each other and from adjacent tracks on the recording medium, and/or various system states.

14. A device to detect a reproducing signal, comprising:
   an optical detection device comprising a photodetector to receive an optical signal reflected from an optical recording medium and to divide the received signal into multiple signals;
   a detector to detect instantaneous outputs of the optical detection device corresponding to a combination of signals corresponding to sections of the photodetector arranged in a tangential direction, outputs corresponding to a combination of signals corresponding to sections of the photodetector arranged in a radial direction, and/or outputs corresponding to a combination of signals corresponding to sections of the photodetector arranged diagonally;
   a control unit to provide a selection control signal and a compensation signal based upon results of detection of data conditions recorded on the optical recording medium, an interference between optical signals reflected/diffracted from pits in close proximity to each other and from adjacent tracks on the recording medium, and/or various system states; and
   a compensator to select some of the outputs of the optical detection device provided via the detector in response to the selection control signal, and to adaptively compensate for the selected outputs in response to the compensation signal.

15. The device of claim 14, wherein the compensator comprises:
   a selector to select some of the outputs of the optical detection device provided via the detector in response to the selection control signal; and
   an equalizer to adaptively equalize the selected outputs of the optical detection device in response to the compensation signal.

16. A device to detect a reproducing signal, comprising:
   an optical detection device comprising a photodetector to receive an optical signal reflected from a single track on an optical recording medium and to divide the received signal into multiple signals;
   a detector to detect outputs of the optical detection device corresponding to a combination of signals corresponding to sections of the photodetector arranged in a tangential direction, outputs corresponding to a combination of signals corresponding to sections of the photodetector arranged in a radial direction, and/or outputs corresponding to a combination of signals corresponding to sections of the photodetector arranged diagonally;
   an equalizer to equalize and reproduce each of the outputs of the detector; and
   a control unit to adaptively control an equalization amount of the equalizer based on results of detection of data conditions recorded on the optical recording medium, an interference between optical signals reflected/diffracted from pits in close proximity to each other and from adjacent tracks on the optical recording medium, and/or various system states, and to provide a good signal, from among the output signals of the equalizer, as the reproducing signal.

17. A method of detecting a reproducing signal comprising:
  reflecting an optical signal from an optical recording medium;
  dividing said optical signal into a plurality of divided signals;
  adding a first at least two divided signals from said plurality of divided signals to form a first output signal;
  adding a second at least two divided signals from said plurality of divided signals to form a second output signal, wherein said first output signal differs from said second output signal; and
  selecting said first output signal or said second output signal as the reproducing signal, wherein the reproducing signal is the least degraded of said first output signal and said second output signal.

18. The method of claim 17, wherein said dividing of said optical signal into said plurality of divided signals comprises dividing said optical signal into sections in a radial direction of the optical recording medium, and said adding of said first at least two divided signals and said adding of said second at least two divided signals each comprise adding divided signals in the radial direction.

19. The method of claim 17, wherein said dividing of said optical signal into said plurality of divided signals comprises dividing said optical signal into sections in a tangential direction of the optical recording medium, and said adding of said first at least two divided signals and said adding of said second at least two divided signals each comprise adding divided signals in the tangential direction.

20. The method of claim 17, wherein said dividing of said optical signal into said plurality of divided signals comprises dividing said optical signal into sections in a diagonal direction of said optical recording medium, and said adding of said first at least two divided signals and said adding of said second at least two divided signals each comprise adding divided signals in the diagonal direction.

21. The method of claim 17, further comprising equalizing the reproducing signal.

22. A method of detecting a reproducing signal comprising:
  dividing signals received from a single track on an optical detection device in response to a reflected signal from an optical recording medium; and
  selecting ones of the divided signals that are least degraded to detect the reproducing signal.

23. The method of claim 22, further comprising reproducing the selected signals based upon data conditions recorded on the optical recording medium.

24. A device to detect a reproducing signal, comprising:
  a detector to divide an optical signal reflected from an optical recording medium into a plurality of divided signals;
  a first adding unit to add a first at least two divided signals from said plurality of divided signals to form a first output signal;
  a second adding unit to add a second at least two divided signals from said plurality of divided signals to form a second output signal, wherein said first output signal differs from said second output signal; and
  a selecting unit to select said first output signal or said second output signal as the reproducing signal, wherein the reproducing signal is the least degraded of said first output signal and said second output signal.

25. The device of claim 24, further comprising an equalizing unit to equalize the reproducing signal.

26. The device of claim 25, wherein said detector divides said optical signal into sections in a diagonal direction of the optical disc, and said first adding unit and said second adding unit add divided signals in the diagonal direction.

27. The device of claim 25, wherein said detector divides said optical signal into sections in a radial direction of the optical disc, and said first adding unit and said second adding unit add divided signals in the radial direction.

28. The device of claim 25, wherein said detector divides said optical signal into sections in a tangential direction of the optical disc, and said first adding unit and said second adding unit add divided signals in the tangential direction.

29. The device of claim 28, further comprising a control unit to control an equalization amount of the equalizing unit based on data conditions recorded on the optical recording medium, an interference between optical signals reflected/diffracted from pits in close proximity to each other and from adjacent tracks on the optical recording medium, and/or various system states.

30. The device of claim 29, wherein said detector divides said optical signal into four divided signals.

31. The device of claim 30, wherein said detector divides said optical signal into eight divided signals.

32. A device to detect a reproducing signal, comprising:
  a pickup unit to detect information recorded on an optical recording medium and to project a beam emitted from a light source to the optical recording medium;
  a detector to divide an optical signal reflected from the optical recording medium into a plurality of divided signals;
  a first I/V converter to convert said divided signals from divided signals into divided voltage signals;
  a first adding unit to add a first at least two divided voltage signals from said plurality of divided voltage signals to form a first output signal;
  a second adding unit to add a second at least two divided voltage signals from said plurality of divided voltage signals to form a second output signal, wherein said first output signal differs from said second output signal;
  a selecting unit to select said first output signal or said second output signal as a reproducing signal, wherein the reproducing signal is the least degraded of said first output signal and said second output signal; and
  a system state detector to detect defocusing, detracking and/or tilting, data conditions and an interference between optical signals reflected/diffracted from pits in close proximity to each other and from adjacent tracks on the recording medium, and to provide a selection control signal to the selecting unit to select the least degraded of said first output signal and said second output signal.

* * * * *